Nov. 14, 1950     R. GOODWIN     2,530,163

METHOD OF FORMING ENDLESS TOROIDAL WIRE SPRING BELTS

Filed March 13, 1948

INVENTOR
REGINALD GOODWIN
By Francis E. Boyer
Attorney

Patented Nov. 14, 1950

2,530,163

UNITED STATES PATENT OFFICE 2,530,163

METHOD OF FORMING ENDLESS TOROIDAL WIRE SPRING BELTS

Reginald Goodwin, Newcastle-upon-Tyne, England, assignor to George Angus and Company Limited, Newcastle-upon-Tyne, England Application March 13, 1948, Serial No. 14,766
In Great Britain April 24, 1947

3 Claims. (Cl. 154—116)

This invention relates to endless toroidal wire springs, usually known as garter springs, and also to endless toroidal wire spring belts, and its object is to provide such springs and belts with effective sheaths of rubber, including oil-resistant synthetic rubber.

Even when not specified, the term rubber in the following description is intended to include synthetic rubber.

Now according to the present invention, in an endless toroidal wire spring or an endless toroidal wire spring belt sheathed in a rubber tube, the rubber tube is vulcanised to form an endless structure. Thus not only is the wire spring or spring belt itself endless, but the rubber tube in which it is sheathed is likewise endless, and therefore completely protective.

In carrying out the present invention, a tube of unvulcanised rubber or synthetic rubber, produced by extrusion and cut to the correct length, is slipped over the coiled wire spring or spring belt before the two ends of the spring or spring belt are joined together to render the spring or belt endless.

The toroidally coiled wire spring or spring belt is rendered endless in the usual manner, by coiling one end into a short cone which is screwed into the other end, the spring having been twisted several turns in the unwinding direction to avoid the thereafter formed screwed-in joint being under torsional strain.

If the rubber tube is of the correct length, the two ends thereof meet on the two ends of the wire spring or spring belt being joined together. The meeting ends of the rubber tube are then enclosed in a steel mould and vulcanised together by heat. With small springs, the entire rubber sheathed spring can be enclosed in a mould of the required size. Large springs and spring belts can have the joint of the rubber sheath vulcanised in a heated mould extending only a slight distance each side of the joint. After the joint has been vulcanised and removed from the mould, the remainder of the sheath can be vulcanised in an oven or steam vulcanising pan into which the entire sheathed spring or spring belt is placed.

Long spring belts can be formed of several lengths of rubber-sheathed coiled wire joined end to end, with each sheath joint separately vulcanised, and the rest of the sheath subsequently vulcanised, as above described.

Normally the rubber does not become bonded to the outside surface of the coiled wire spring. The rubber can however be caused to become bonded to the wire spring by special treatment of the latter, such as by electroplating, chemical cleaning, or sand blasting. An unbonded rubber sheathed spring may prove more satisfactory in practice, as well as being cheaper to produce.

A representative garter spring and portions of a spring belt to which the present invention is applicable, are shown on the accompanying drawing, in which.

Figure 1:
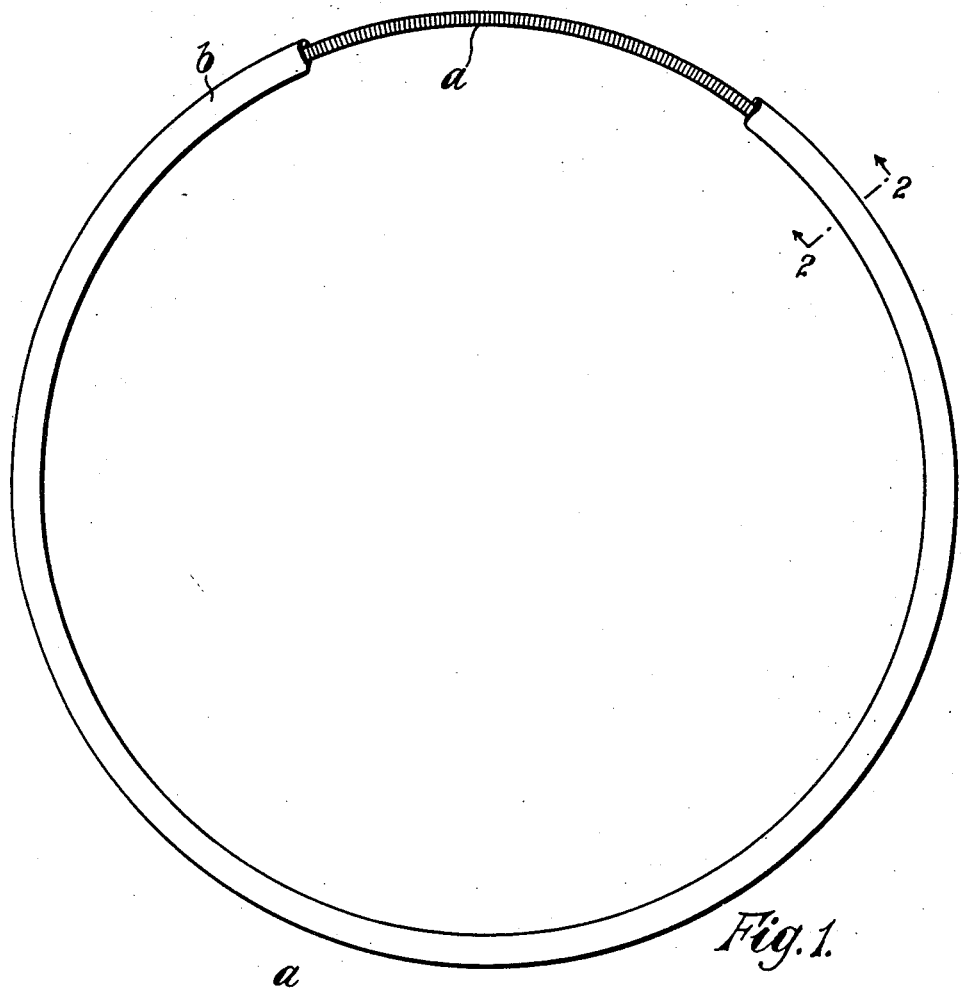
Fig. 1 is a side elevation of a complete garter spring, with a portion of the synthetic rubber sheath cut away to expose the coiled wire spring.
Figure 2:
Fig. 2 is a cross section on the line 2—2 of Fig. 1.

Referring to the garter spring shown in Figs. 1 and 2, $a$ is a toroidally coiled wire spring the two ends of which have been joined together to render the spring endless. $b$ is an endless tubular coating of synthetic rubber sheathing the spring $a$.

Figure 4:
Fig. 4 is a cross section thereof.
Figure 3:
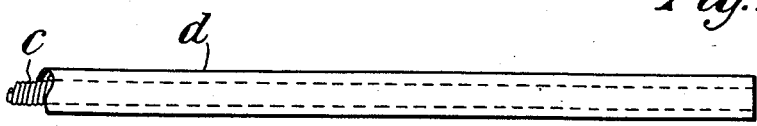
Fig. 3 is a side elevation of a portion of a sheathed coiled wire spring belt.

$c$, Figs. 3 and 4, is a toroidally coiled wire spring belt of which only a portion is shown, but the full length of which is joined at the ends to be endless. The spring belt $c$ is sheathed in an endless tubular coating $d$ of synthetic rubber.

Figure 5:
Fig. 5 is a side elevation of two ends of the belt with the synthetic rubber sheath cut away to expose the means for joining the two ends of the coiled wire belt together.

As shown in Fig. 5 the two ends of the coiled wire belt $c$, and likewise the two ends of the garter spring $a$, are joined together by the wire at one end being coiled into a slightly tapered spigot $e$ of reduced diameter, which is screwed into the socket provided by the other, opposed, unreduced end $f$ of the coiled wire belt $c$ or garter spring $a$. The spring belt $c$ or garter spring $a$ is twisted a few turns in the unwinding direction before screwing the spigot $e$ into the socket $f$, in order that the screwed-in joint shall not be subjected to a torsional unscrewing strain.

Although what is considered to be the most satisfactory form of joint of an endless toroidal spring or spring belt, namely the screwed-in spigot and socket joint, has been described, other forms of joint such as unwinding and forming each of the two ends of the wire into a hook or eye which are interengaged, or welding or brazing the two ends together, may be employed.

The rubber sheath, instead of being round or cylindrical as shown, may be polygonally prismatic, for instance to form a V belt.

I claim:

1. A method of forming an endless toroidal wire spring sheathed by an endless rubber tube, consisting in slipping unvulcanised rubber tubing over a length of toroidal wire spring, joining the ends of said length of toroidal wire spring, subsequently vulcanising end portions of said rubber tubing with adjoining ends meeting and confined, and thereafter vulcanising the remainder of said rubber tubing unconfined.

2. A method of forming an endless toroidal wire spring belt sheathed by an endless rubber tube, consisting in slipping unvulcanised rubber tubing over a length of toroidal wire spring belt, joining the ends of said length or toroidal wire spring belt, subsequently vulcanising end portions of said rubber tubing with adjoining ends meeting and confined, and thereafter vulcanising the remainder of said rubber tubing unconfined.

3. A method of forming an endless toroidal wire spring belt sheathed by an endless rubber tube, consisting in slipping lengths of unvulcanised rubber tubing over lengths of toroidal wire spring belt, joining said lengths of toroidal wire spring belt end-to-end into an endless belt, subsequently vulcanising end portions of said lengths of rubber tubing with adjoining ends meeting and confined, and thereafter vulcanising the remainder of said rubber tubing unconfined.

REGINALD GOODWIN.

REFERENCES CITED

The following references are of record in the file of this patent:

UNITED STATES PATENTS

| Number | Name | Date |
|---|---|---|
| 984,099 | Manoog | Feb. 14, 1911 |
| 1,031,515 | Bluemel et al. | July 2, 1912 |
| 1,492,363 | Edson | Apr. 29, 1924 |
| 1,586,737 | Geyer | June 1, 1926 |
| 1,918,135 | Resch | July 11, 1933 |
| 1,998,817 | Meyer | Apr. 23, 1935 |
| 2,161,080 | Murphy et al. | June 6, 1939 |
| 2,288,669 | Atkinson | July 7, 1942 |
| 2,294,589 | Waterbury | Sept. 1, 1942 |
| 2,300,706 | Schott | Nov. 3, 1942 |
| 2,466,951 | Hunter | Apr. 12, 1949 |

FOREIGN PATENTS

| Number | Country | Date |
|---|---|---|
| 21,190 | Great Britain | 1903 |
| 202,334 | Great Britain | Aug. 17, 1923 |